(12) United States Patent
Moxley

(10) Patent No.: US 7,502,696 B2
(45) Date of Patent: Mar. 10, 2009

(54) SYSTEM AND METHOD FOR DETECTING POWER SYSTEM CONDITIONS

(75) Inventor: Roy E. Moxley, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 582 days.

(21) Appl. No.: 11/265,417

(22) Filed: Nov. 2, 2005

(65) Prior Publication Data
US 2007/0100504 A1 May 3, 2007

Related U.S. Application Data

(60) Provisional application No. 60/729,342, filed on Oct. 21, 2005.

(51) Int. Cl.
G01R 21/06 (2006.01)

(52) U.S. Cl. ...................................................... 702/60

(58) Field of Classification Search .............. 702/57–59, 702/62, 75, 90, 104, 116, 182–185, 193; 324/531, 535, 541, 544, 771
See application file for complete search history.

(56) References Cited

U.S. PATENT DOCUMENTS

| 3,575,603 | A | | 4/1971 | Schlicher | |
|---|---|---|---|---|---|
| 4,105,900 | A | | 8/1978 | Martin et al. | |
| 4,686,673 | A | * | 8/1987 | Hotta | 370/324 |
| 5,958,060 | A | | 9/1999 | Premerlani | |
| 6,611,922 | B2 | | 8/2003 | Ozcetin et al. | |
| 6,714,881 | B2 | | 3/2004 | Carlson et al. | |
| 7,106,564 | B2 | * | 9/2006 | Deng et al. | 361/62 |
| 2001/0012984 | A1 | * | 8/2001 | Adamiak et al. | 702/58 |

OTHER PUBLICATIONS

Cho, Seung, Rock Island Hydro System Islanding Analysis, Paper, Oct. 21, 2003, pp. 1-19, Spokane Washington.
Moxley, Display and analysis of transcontinental synchrophasors, Schweitzer Engineering Laboratories, Inc., 2004.

* cited by examiner

Primary Examiner—Edward Raymond
Assistant Examiner—Mohamed Charioui
(74) Attorney, Agent, or Firm—Eugene M. Cummings, P.C.

(57) ABSTRACT

Provided is a system and method for detecting a power system condition of a power system. The system includes at least a first and second intelligent electronic device (IED) operatively coupled to the power system at respective first and second power system locations. Each IED is configured to calculate a measured time value based on a frequency dependant parameter such as a secondary voltage signal at their respective locations, to compare the measured time value to a reference time value to form a time error, and to transmit the time error. The system further includes a third IED configured to compare respective time errors received from the first and second IEDs to form a time differential error, to map the time differential error back to their power system locations, and compare the time differential error to a predetermined threshold to determine the power system condition.

66 Claims, 5 Drawing Sheets

SYSTEM AND METHOD FOR DETECTING POWER SYSTEM CONDITIONS

CROSS-REFERENCE TO RELATED APPLICATIONS

This application claims benefit under 35 U.S.C. §119(e) of U.S. Provisional Application No. 60/729,342 entitled "System and Method for Detecting Power System Conditions", filed on Oct. 21, 2005, naming Roy E. Moxley as inventor, the complete disclosure thereof being incorporated by reference.

BACKGROUND OF THE INVENTION

The present invention generally relates to power system monitoring, and more specifically, to a system and method for detecting power system conditions.

Electric utility systems or power systems are designed to generate, transmit and distribute electrical energy to loads via a variety of power system elements such as electrical generators, power transformers, power transmission lines, distribution lines, buses and capacitors, to name a few. As a result, power systems are typically monitored and protected using a number of different types of protective devices having associated protective schemes. Such protective schemes protect the power system elements from abnormal conditions such as electrical short circuits, overloads, power swings, pole slips, frequency excursions, voltage fluctuations, and the like.

In general, protective devices and their protective schemes act to isolate, or disconnect portions of the power system or power system element(s) (e.g., a generator, transformers, buses, motors, etc.) from the remainder of the power system upon detection of an abnormal condition or fault in one or more power system element(s). Such protective devices may include different types of protective relays, surge protectors, arc gaps and associated circuit breakers and reclosures.

Inadvertent disconnection of one or more portions of the power system however is undesirable. Such "islanding" may occur during excessive power flow conditions, transmission line maintenance, periods following damage to elements of the power system, etc. causing circuit breaker operation to isolate that portion of the power system from the remainder. As a result of islanding, power generation and loads may not balanced, thereby causing undesirable decreases or increases in the power system frequency, loss of available power for motor starting, or loss of coordination of the protective device, to name a few. At a minimum, islanding causes a loss of generation and load diversity and therefore reduces power system reliability. In cases where power system operators are unaware of the existence of one or more the power system "islands" or are unable to pin-point boundaries of the power system islands, they may not take appropriate corrective actions. Equipment damages, loss of generators and loads may follow.

The problem of islanding has been addressed using a variety of methods. One method includes viewing/monitoring power system frequency at various locations throughout the power system. Unfortunately, the direct use of power system frequency to determine an occurrence of islanding, or to pin-point islanding locations, is inherently slow and may therefore fail to detect the islanding before automatic or manual controls exacerbate the problem. In addition to its inherent speed problem, instruments used to view the power system frequency may not have the necessary response characteristic required to accurately depict the situation to the power system operator.

SUMMARY OF THE INVENTION

In general, provided is a system and a method for detecting power system conditions by comparing a plurality of time errors determined at discrete locations throughout the power system to form time error differences, or time differential errors. When compared to a threshold value, the time differential errors are determinative of whether a particular power system condition may exist.

More specifically, provided is a system for detecting a power system condition of a power system. The system includes a first intelligent electronic device operatively coupled to the power system at a first power system location. The first intelligent electronic device is configured to calculate a first measured time value based on a frequency dependant parameter measured at the first power system location, to compare the first measured time value to a reference time value to form a first time error, and to transmit the first time error. The system also includes a second intelligent electronic device operatively coupled to the power system at a second power system location. The second intelligent electronic device is configured to calculate a second measured time value based on the frequency dependant parameter measured at the second power system location, to compare the second measured time value to the reference time value to form a second time error, and to transmit the second time error. In this instance, the frequency dependent parameter is a secondary voltage signal providing a number of power system cycles. The system further includes a third intelligent electronic device operatively coupled to the first and second intelligent electronic device. The third intelligent electronic device is configured to receive and compare the first time error and the second time error to form a time differential error, to map the time differential error back to the first and second power system location, and to compare the time differential error to a predetermined threshold. The comparison is determinative of the power system condition.

Also provided is a method for detecting a power system condition of a power system. The method includes calculating a measured time value based on a secondary voltage signal of a power system location of a plurality of power system locations of the power system. The measured time value is based on a frequency dependant parameter at the power system location; in this case a number of power system cycles derived from a secondary voltage signal measured at the power system location, divided by a nominal power system frequency to yield the measured time value. The method also includes comparing the measured time value to a reference time value to form a time error. The reference time value is provided by a synchronized clock means, and the time error is equal to a difference between the measure time value and the reference time value. The method further includes transmitting the time error where the time error is subsequently compared to selected time errors corresponding to other power system locations of the plurality of power system locations to form a plurality of time differential errors. Each of the plurality of time differential errors is mapped back to respective power system locations of the plurality of power system locations and compared to a predetermined threshold to detect the power system condition.

Additionally provided is a method for detecting an undesirable power system condition of a power system. The method includes calculating a plurality of time differential errors where each of the plurality of time differential errors is equal to a difference between two different time errors of a plurality of time errors, and each of the plurality of time errors is calculated at a corresponding different location of the power system and is based on a comparison of a measured time value to a reference time value. Each of the measured time values is based on a corresponding secondary voltage signal measured at the corresponding different location of the power system. The method further includes mapping each of the plurality of time differential errors back to the corresponding different location of the power system, and declaring the undesirable power system condition for the corresponding different locations associated with time differential errors that exceed a predetermined threshold.

Further provided is another method for detecting a power system condition of a power system. The method includes receiving a plurality of time errors where each of the plurality of time errors is equal to a difference between a reference time value and one of a plurality of measured time values. Each of the plurality of measured time values is based on a frequency dependent parameter measured at a different power system location of a plurality of power system locations of the power system, and the reference time value is provided by a synchronized clock means. The method also includes comparing each time error of the plurality of time errors to other selected time errors of the plurality of time errors to form a plurality of time differential errors, mapping each of the plurality of time differential errors back to corresponding power system locations of the plurality of power system locations, and comparing each of the plurality of time differential errors to a corresponding predetermined threshold, where the comparison determinative of the power system condition.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE INVENTION

Figure 1:
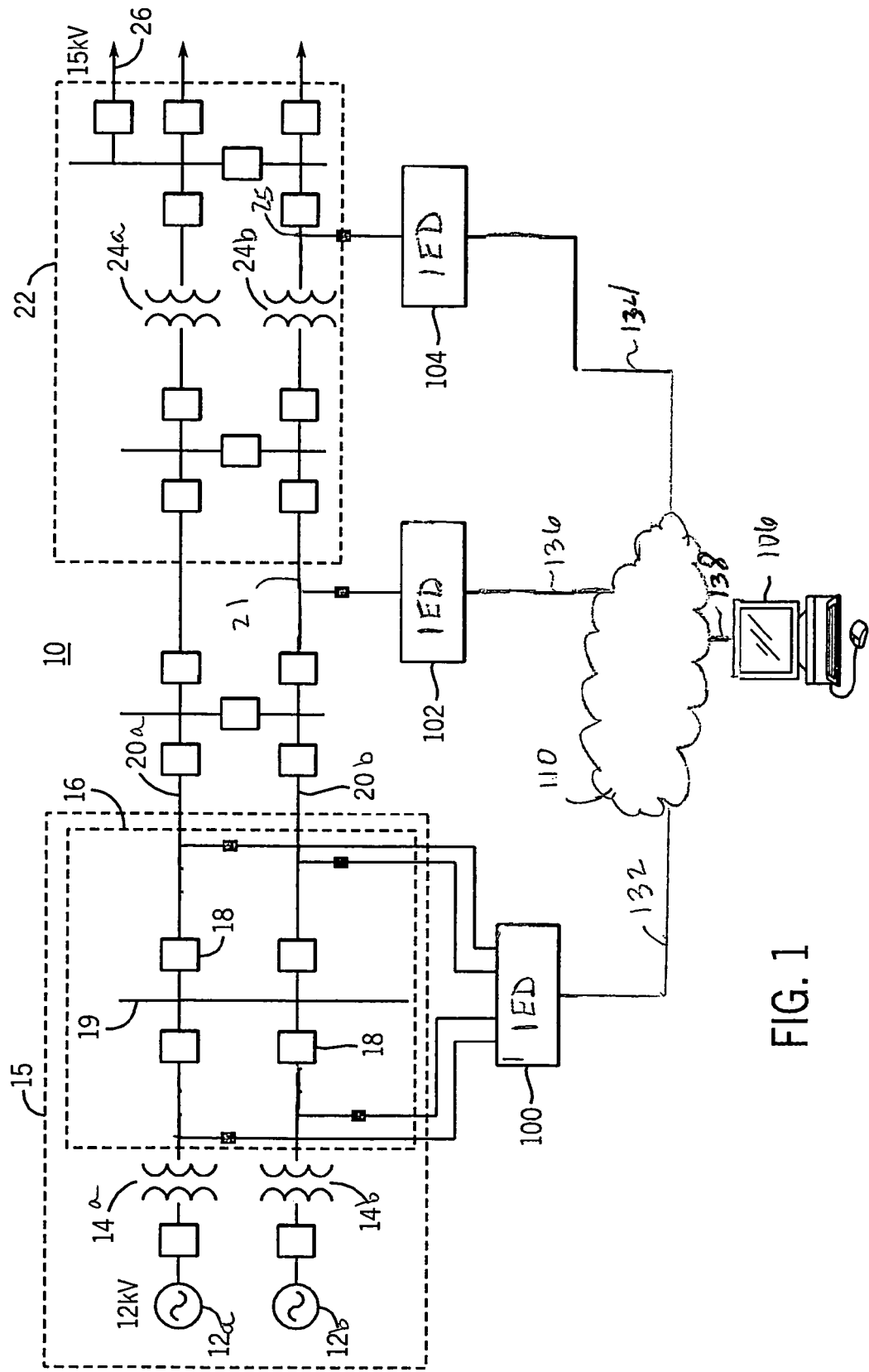
FIG. 1 is a single line schematic diagram of a power system that may be utilized in a typical wide area.

FIG. 1 is a single line schematic diagram of a power system 10 that may be utilized in a typical wide area. As illustrated in FIG. 1, the power system 10 includes, among other things, two generators 12a and 12b, configured to generate three-phase sinusoidal waveforms such as 12 kV sinusoidal waveforms, two step-up power transformers 14a and 14b, configured to increase the generated waveforms to a higher voltage sinusoidal waveforms such as 138 kV sinusoidal waveforms and a number of circuit breakers 18. The step-up power transformers 14a and 14b operate to provide the higher voltage sinusoidal waveforms to a number of long distance transmission lines such as the transmission lines 20a and 20b. In an embodiment, a first substation 15 may be defined to include the two generators 12a and 12b, the two step-up power transformers 14a and 14b and associated circuit breakers 18, all interconnected via a first bus 19. At the end of the long distance transmission lines 20a, 20b, a second substation 22 includes two step-down power transformers 24a and 24b configured to transform the higher voltage sinusoidal waveforms to lower voltage sinusoidal waveforms (e.g., 15 kV) suitable for distribution via one or more distribution lines.

As previously mentioned, the power system 10 includes protective devices and schemes to protect the power system elements from faults or other abnormal conditions For example, a first intelligent electronic device (IED) 100 provides fault protection for the transmission lines 20a and 20b of a protection zone 16. A second IED 102 provides fault protection for transmission line 21, while a third IED 104 provides fault protection for a distribution line 25. In general, each of the first, second and third IEDs 100, 102, 104 may include one or more protective relay elements (e.g., directional overcurrent element, instantaneous overcurrent element, time overcurrent element, overvoltage element). Although not separately illustrated in FIG. 1, each of the first, second and third IEDs 100, 102, 104 may include communication capability with each other and/or with additional IEDs, and may be adapted to receive synchronized clock signals (e.g., IRIG-B signals) to enable IED operation.

In addition to protective devices and procedures, the power system 10 may include a networked communication system 110 adapted to route relay data, thermal data, metering data, to name a few, to each of the first, second and third IEDs 100, 102, 104 and to one or more computers/servers such as the IED 106. The networked communication systems 110 may enable engineering control and monitoring access capability, data processing, data alignment, software upgrades, configuration control and visualization (i.e., display of phasors representative of the currents and voltages in various areas of the power system 10. Thus, in addition to computers/servers, the networked communication system 110 may include a number of routers, Ethernet hubs, modems, RF links, communications processors interconnected via serial, Ethernet and the like (not separately illustrated).

As noted above, the power system 10 may be subjected to any number of undesirable conditions that may have catastrophic consequences. For example, undesirable power system islanding may occur due to conditions that cause inadvertent circuit breaker tripping and the like. Undesirable pole slipping may also occur when a power system generator advances or retreats 360 degrees from the power system 10. Under most conditions the generator will operate out of synchronism and the pole slip condition will be detected by power system personnel. There are cases however the pole slip may go undetected when the generator remains in step after slipping one pole. As noted in detail below, the system and method for detecting power system conditions disclosed herein may be utilized to detect such a pole slip condition. For example, subsequent to a pole slip, a 60 Hz power system may yield a 16.7 ms time error difference, while a 50 Hz power system may yield a 20 ms time error difference. Thus, the "historical" nature of the calculated time error differences permits detection of conditions such as the pole slip when the generator stays in step after slipping one pole. Similarly, power swings in the power system 10 may also be detected as an increase or a decrease in the time error difference using the system and method disclosed herein.

Figure 2:
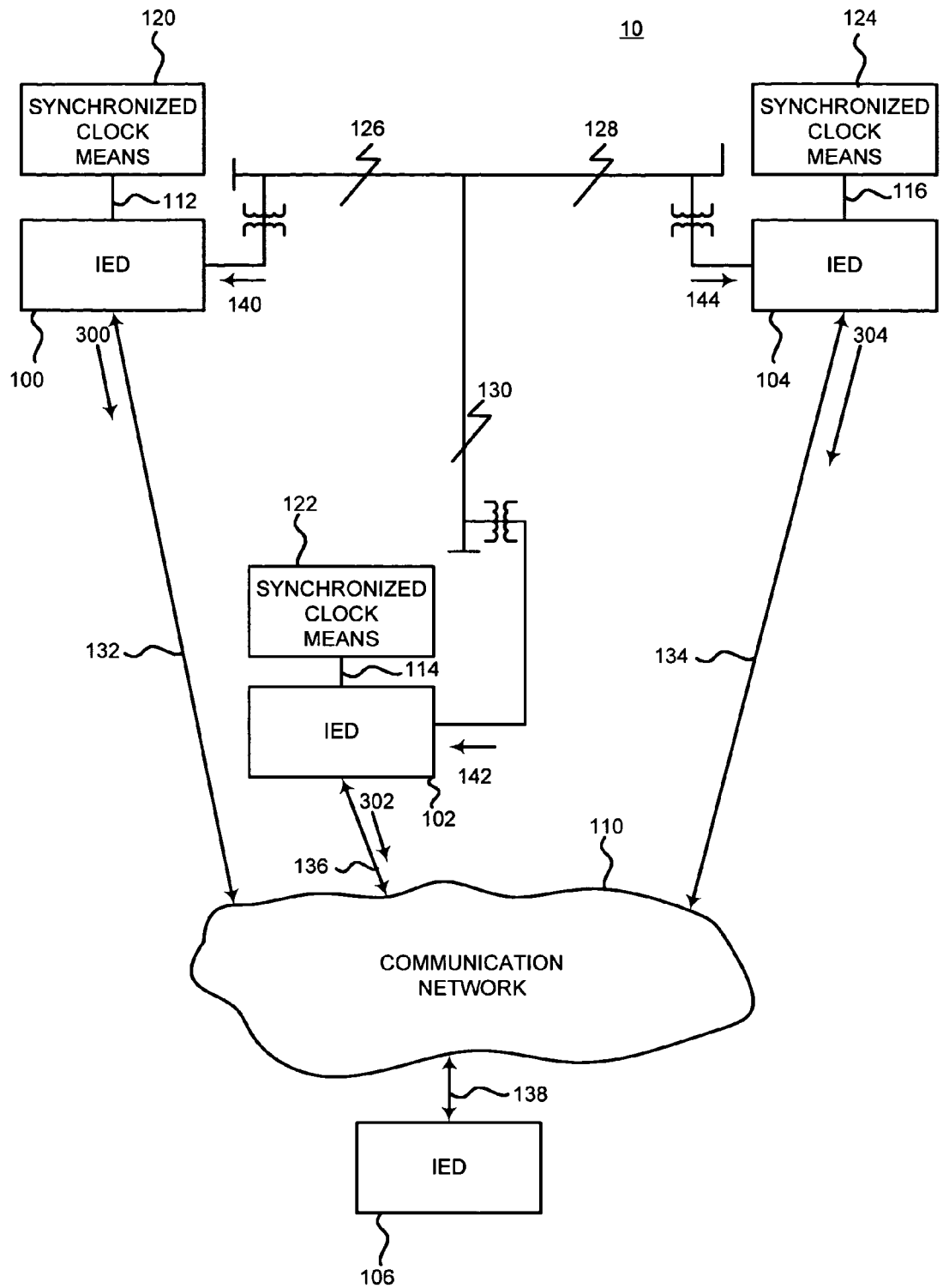
FIG. 2 is an exemplary detailed block diagram of the networked IEDs of FIG. 1, according to an embodiment of the invention.

FIG. 2 is an exemplary detailed block diagram of the networked IEDs 100, 102, 104, 106 according to an embodiment of the invention. Referring to FIG. 2, each of the first, second and third IEDs 100, 102, 104 utilize reference time values 112, 114, 116 derived from synchronized clock signal provided by respective synchronized clock means 120, 122 and 124. Although preferably a satellite synchronized clock, one or more of the IEDs 100, 102, 104 may utilize another type of synchronized clock means. Each of the first, second and third IEDs 100, 102, 104 also utilize frequency-based measured time values 140, 142, 144 derived from respective secondary voltage signals (described below) provided by coupled voltage transformers. The stepped-down or secondary voltage signals correspond to the primary power system voltage waveforms at the discrete locations defined by placement of each of the first, second and third IEDs 100, 102, 104 and their corresponding voltage (or current) transformers.

Referring to the first IED 100 for ease of discussion, during operation, a secondary voltage signal (and current) is filtered, multiplexed, sampled and then digitized to form a corresponding digitized voltage signal suitable for use by a microcontroller (or equivalent) of the first IED 100. The digitized voltage signal is digitally filtered via, for example, a Cosine filter used to eliminate DC and unwanted harmonic frequency components. In general, the microcontroller of the IED 100 executing a computer program, protection algorithm or relay logic scheme (based on the relay elements) samples and processes the digitized voltage signal to extract phasors, each having a magnitude and phase angle representative of the primary voltage waveform at a discrete time, and then performs various calculations using the phasors. More specifically, utilizing samples derived from the digitized voltage signals, the microcontroller, executing an algorithm, calculates a measured time value of the power system assuming that, for example, that 60 power cycles occur in 1 second (i.e., 60 cycles per second).

Figure 3:
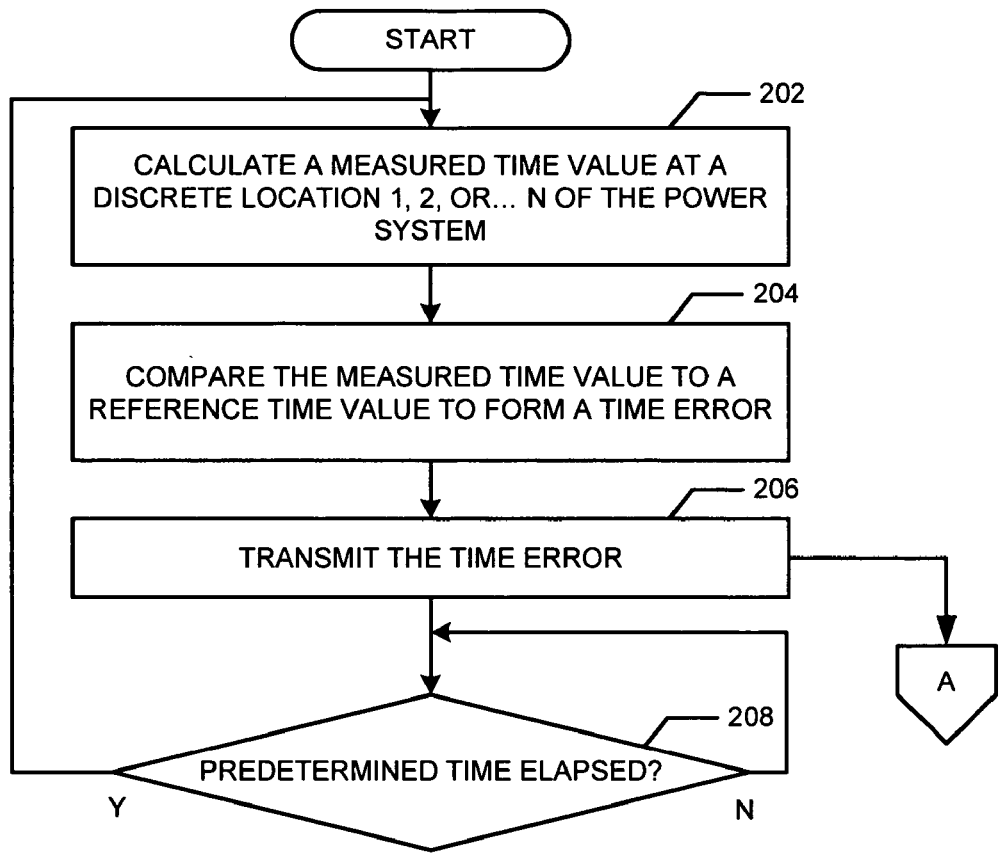
FIG. 3 is a flowchart of a method that may be used by the IEDs of FIG. 2 to calculate a time error, according to an embodiment of the invention.
Figure 5:
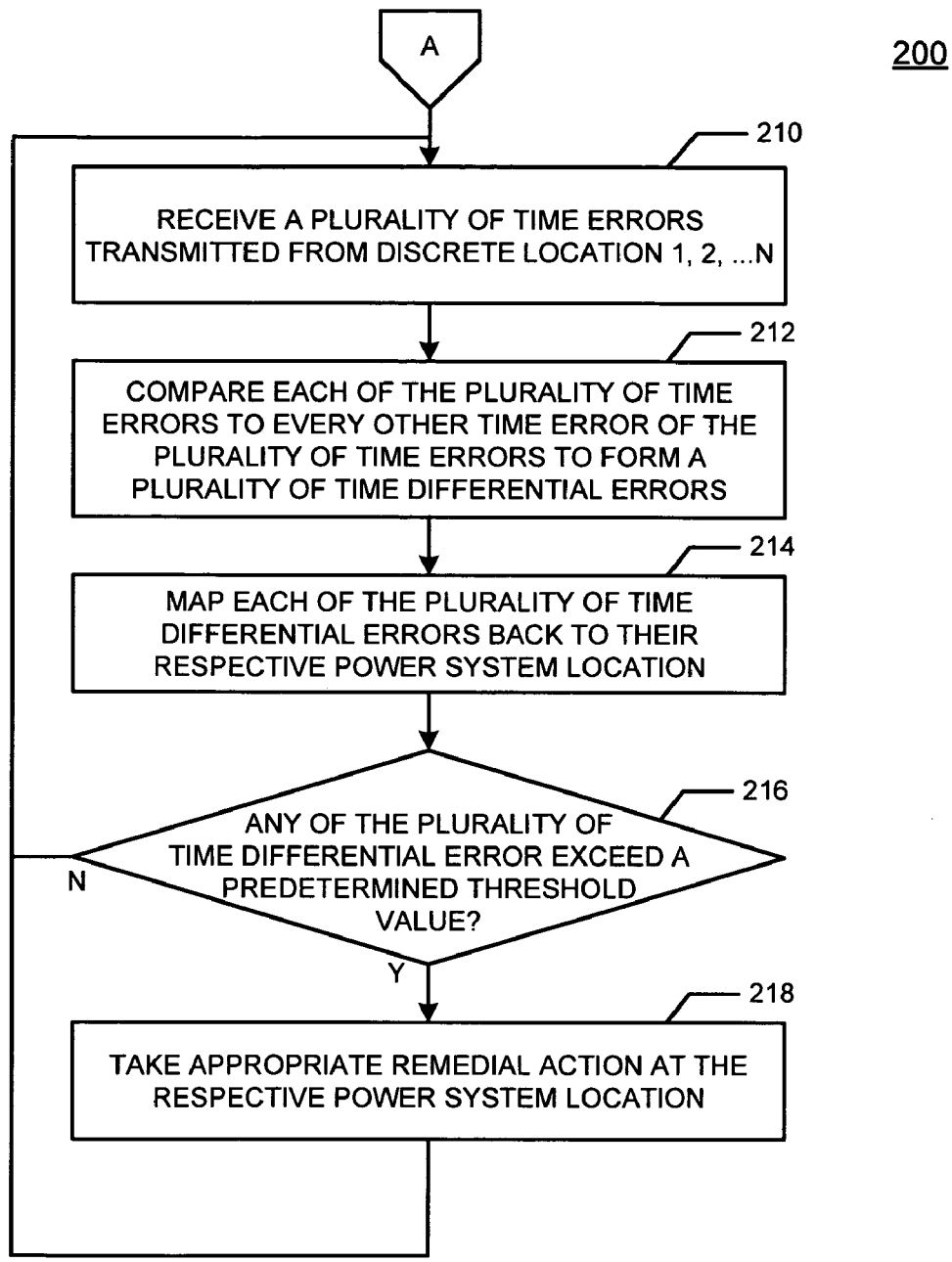
FIG. 5 is a block diagram of logic that may be used by the IEDs of FIG. 2 to form a plurality of time differential errors used to determine a power system condition, according to an embodiment of the invention

As noted above, direct use of power system frequency to determine an occurrence of islanding, or to pin-point islanding locations, is inherently slow. FIGS. 3 and 5 are flowcharts of a method 200 for determining a power system condition, according to an embodiment of the invention. Many power system conditions may be monitored and identified via use of the method 200. For example, the method 200 for determining a power system condition may be used to determine an occurrence of islanding or to pin-point islanding locations. The method 200 for determining a power system condition may also be used to detect pole slipping (i.e., power generator advances or retreats 360 electrical degrees from the power system as a whole) and power swings, to name a few.

Referring specifically to the first flowchart, FIG. 3 is a flowchart of a portion of the method 200 that may be used by the first, second and third IEDs 100, 102, 104 to calculate a time error, according to an embodiment of the invention. The method 200 begins when respective microcontrollers of each of the first, second and third IEDs 100, 102, 104 calculate respective measured time values 140, 142, 144 derived from corresponding secondary voltage signals (step 202). That is, utilizing samples derived from the digitized voltage signals, the microcontroller calculates a measured time value of the power system based on a number of counted power cycles and the nominal power system frequency. For example, utilizing samples derived from the digitized voltage signals, the microcontroller counts 1210 power cycles beginning at t=0, and assuming a nominal frequency of 60 cycles/sec over the same time period, the measured time value of the power system is equivalent to 20.16 seconds. Although preferably derived from digitized voltage signals, it is contemplated that the measured time value at each of the power system locations may also be derived from any frequency dependent parameters having established frequency stability.

Next, using respective reference time values 112, 114, 116 derived from synchronized clock signals, the respective microcontrollers compare respective measured time values 140, 142, 144 to respective reference time values 112, 114, 116 to form respective time errors 300, 302 and 304 (step 204). Each of the respective time errors 300, 302 and 304 is equal to a difference between its measure time value and its reference time value. Thus, if the reference time value is 20 seconds (representing a nominal 1200 power system cycles), and the measured time value of the power system is equivalent to 20.16 seconds, the time error is determined 0.16 seconds.

Next, the time errors 300, 302, 304 are transmitted to another IED, in this case, to the fourth IED 106, for a determination of power system conditions. Transmission of the time errors 300, 302, 304 to the fourth IED 106 may be accomplished via one or more well-known transmission means (e.g., wire-line, fiber, radio frequency) using one or more well-known transmission protocols.

Figure 4:
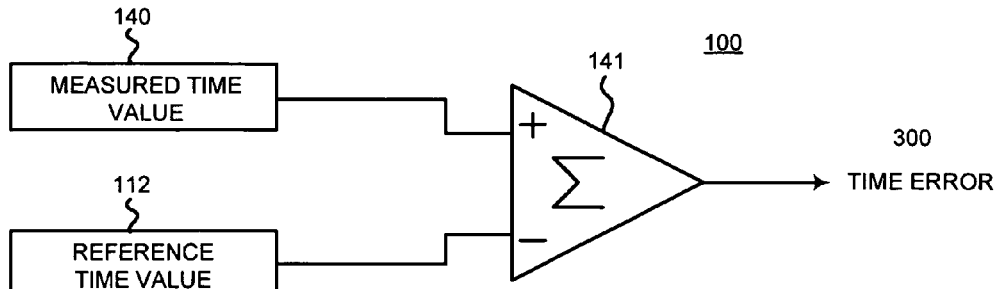
FIG. 4 is a block diagram of logic that may be used by the IEDs of FIG. 2 to calculate a time error, according to an embodiment of the invention.

FIG. 4 is a block diagram of logic that may be used by the microcontroller of the IED 100 to calculate the time error 300, according to an embodiment of the invention. As illustrated, a comparator 141 subtracts the reference time value 112 from the measured time value 140 to form the time error 300.

Referring now to FIG. 5, upon receipt of each of the time errors 300, 302 and 304 (step 210), the microcontroller of the fourth IED 106 performs a series of comparisons to determine a number of time differential errors, or the difference between two compared time errors 300, 302 and 304 (step 212). Each of the plurality of time errors 300, 302, 304 is compared to every other time error to form a plurality of time differential errors.

Figure 6A:
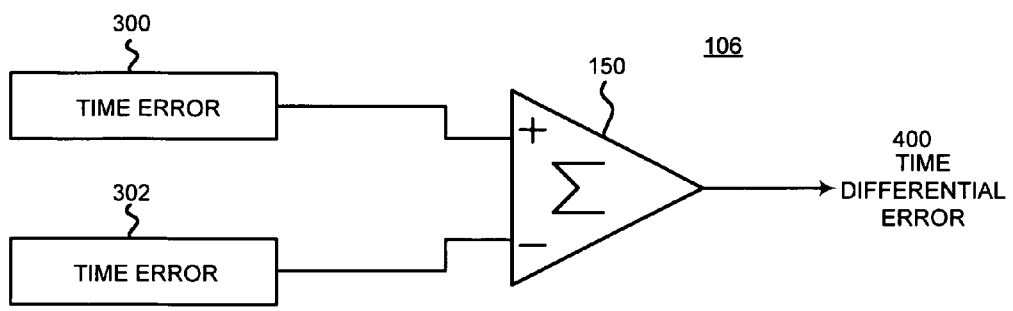
FIGS. 6A, 6B and 6C are block diagrams of logic that may be used by the IEDs of FIG. 2 to compared calculated time errors to form a time differential error, according to an embodiment of the invention.
Figure 6B:
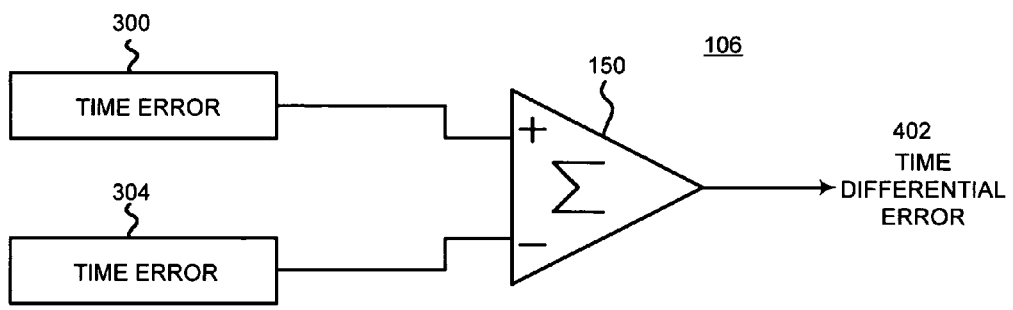
Figure 6C:
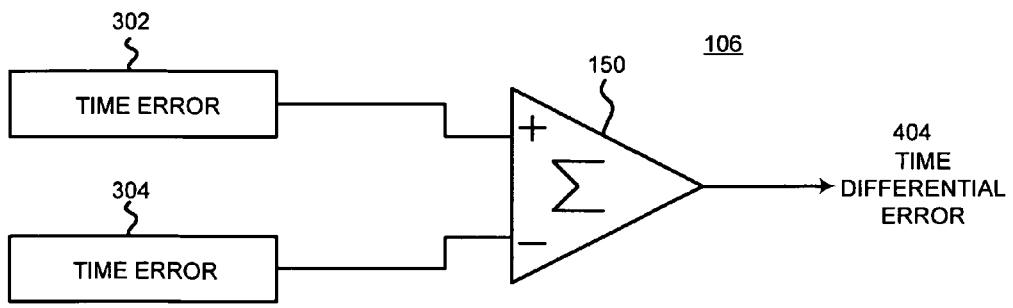

For example, as illustrated in a block diagram FIG. 6A, the first time error 300 is compared to the second time error 302 to generate a first time differential error 400. Similarly, the first time error 300 is compared to the third time error 304 to generate a second time differential error 402 as illustrated in FIG. 6B, and the second time error 302 is compared to the third time error 304 to generate a third time differential error 404 as illustrated in FIG. 6C. Accordingly, if the first time error 300 is equal to 300 ms, the second time error 302 is equal 300 ms, and the third time error 304 equals 317 ms, the first time differential error 400 equals 0, second time differential error 402 equals 17 ms and the third time differential error 404 equals 17 ms. The time differential errors 400, 402 and 404 may be positive or negative indicating the relative conditions of the power system locations. A positive or negative quantity in the time error differential may indicate an islanding condition; a corresponding positive or negative pole slip condition; or a corresponding excess or deficiency of power condition between two power system locations.

As the number of time errors calculated increases so to do the resulting time differential errors. A relationship between the number of time errors calculated and the resulting number of multiple time differential error calculated may be illustrated via a table such as Table 1 below, or may be expressed as $Q=N^2-N$, wherein Q is the maximum possible time error pairs yielding associated time differential errors, and N is the maximum number of power system locations associated with IEDs such as the first, second and third IEDs 100, 102, 104. It should be noted that in some cases, the maximum number time differential errors may not be required. Using the table below, for time errors $TE_1, TE_2, \ldots TE_N$ where numbers 1, 2, ... N correspond to different locations throughout the power system 10 (e.g., the locations of the first, second and third IEDs 100, 102, 104), resulting time differential errors may be calculated as follows:

| $TE_1-TE_1$ | $TE_2-TE_1$ | ... | $TE_N-TE_1$ |
| $TE_1-TE_2$ | $TE_2-TE_2$ | ... | $TE_N-TE_2$ |
| ... | ... | ... | ... |
| $TE_1-TE_N$ | $TE_2-TE_N$ | ... | $TE_N-TE_N$ |

Referring again to FIG. 4, each of the first time differential error 400, the second time differential error 402 and third time differential error 404 are "mapped" back to their respective power system location (step 214). After "mapping" each of the first, second and third time differential errors 400, 402, 404 back to their respective power system locations, the microcontroller of the fourth IED 104 compares each of the time differential errors to a predetermined threshold value (or predetermined value range) to determine power system conditions at respective power system locations. If one or more of the time differential errors exceeds its respective threshold value or is outside of the predetermined value range, appropriate remedial action is taken at the respective power system location (step 218). For example, if a time differential error formed from time errors calculated at two adjacent power system locations exceeds the threshold value, action to remedy an islanding problem between the adjacent power system locations may be taken.

In addition to being a predetermined value range, the threshold value may be an instantaneous threshold value or it may be a threshold value for a predetermined length of time. For example, an island condition may be declared when the time differential error exceeds 16 milliseconds (ms) for any length of time (e.g., 2 ms, 3 ms, 4 ms). In another example, an island condition may be declared if the time differential error exceeds 5 ms for 2 seconds.

If one or more of the time differential errors does not exceed its respective threshold value or is not outside the predetermined value range, no action is taken and the fourth IED 106 awaits the next plurality of time errors. In some cases, the threshold value may vary depending on the power system location and distance separation associated with the time differential error. Similarly, the predetermined value ranges may vary depending on the power system location and distance separation associated with the time differential error. The remedial action may vary depending on the power system condition. Such power system conditions may include islanding, pole flips, power swings, to name a few.

Although FIG. 5 is described in connection with the fourth IED 106, and FIG. 3 is described in connection with the first, second and third IED 100, 102, 104, each of the first, second, third and/or fourth IEDs 100, 102, 104, 106, may be configured to perform the steps of FIG. 3 and/or the steps of FIG. 5, depending on its communication capabilities. Further, although described in terms of comparing two time errors calculated at two different power system locations, other combinations of the time errors may be useful. For example, it may be useful to compare many time errors, calculated a many different power system locations, to one time error calculated at another location to determine the extent of an island condition While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A system for detecting a power system condition of a power system, the system comprising:
    a first intelligent electronic device operatively coupled to the power system at a first power system location, the first intelligent electronic device configured to calculate a first measured time value based on a frequency dependant parameter measured at the first power system location, to compare the first measured time value to a reference time value to form a first time error, and to transmit the first time error;
    a second intelligent electronic device operatively coupled to the power system at a second power system location to the first power system location, the second intelligent electronic device configured to calculate a second measured time value based on the frequency dependent parameter measured at the second power system location, to compare the second measured time value to the reference time value to form a second time error, and to transmit the second time error; and
    a third intelligent electronic device operatively coupled to the first and second intelligent electronic device, the third intelligent electronic device configured to receive and compare the first time error and the second time error to form a time differential error, to map the time differential error back to the first and second power system location, and to compare the time differential error to a predetermined threshold, the comparison determinative of the power system condition.

2. The system of claim 1, wherein the predetermined threshold is a threshold value, and wherein an undesirable power system condition is declared between the first and second power system location if an absolute value of the time differential error is greater than the threshold value.

3. The system of claim 2, wherein the undesirable power system condition is selected from the group consisting of islanding of the first power system location, islanding of the second power system location, pole slipping of a power generator of the power system, and a power swing of the power system.

4. The system of claim 2, further comprising causing a remedial action proximate to at least one of the first and second power system locations.

5. The system of claim 1, wherein each of the first and second time errors are calculated over a variable time period to detect instantaneous power system conditions.

6. The system of claim 1, wherein each of the first and second time errors are calculated over a variable time period to detect historical power system conditions.

7. The system of claim 1, wherein the reference time value is provided by a synchronized clock means operatively coupled to each of the first, second and third intelligent electronic devices.

8. The system of claim 1, wherein the first measured time value equals a first number of power system cycles divided by a nominal power system frequency, and wherein the second measured time value equals a second number of power system cycles divided by the nominal power system frequency, each of the first and second number of power system cycles determined from a corresponding plurality of samples of a digitized voltage signal derived from a second secondary voltage signal at the corresponding first and second power system locations.

9. The system of claim 1, wherein the predetermined threshold is a value range, and wherein an undesirable power system condition is declared between the first and second power system location if a value of the time differential error is outside of the value range.

10. The system of claim 1, wherein the power system comprises a three-phase power system.

11. A method for detecting a power system condition of a power system, the power system including a plurality of intelligent electronic devices operatively coupled to a corresponding plurality of power system locations, the method comprising:
    calculating a first measured time value based on a frequency dependant parameter measured at a first power system location of the plurality of power system locations;
    comparing the first measured time value to a reference time value to form a time error, the reference time value provided by a synchronized clock means, the time error equal to a difference between the first measure time value and the reference time value; and
    transmitting the time error, the time error compared to other time errors transmitted from power system locations other than the first power system location of the plurality of power system locations to form a plurality of time differential errors, each of the plurality of time differential errors mapped back to respective power system locations of the plurality of power system locations and compared to a predetermined threshold to detect the power system condition.

12. The method of claim 11, wherein the predetermined threshold is a threshold value, and wherein an undesirable power system condition is declared at one or more power system locations of the plurality of power system locations if an absolute value of each time differential error associated with the one or more power system locations is greater than the threshold value for a predetermined time period or instantaneously.

13. The method of claim 12, wherein the undesirable power system condition is selected from the group consisting of islanding of at least one power system location of the plurality of power system locations, pole slipping of a power generator of the power system, and a power swing of the power system.

14. The method of claim 12, further comprising causing remedial action to be taken at the one or more power system locations having the undesirable power system condition.

15. The method of claim 11, wherein the frequency dependant parameter comprises a secondary voltage signal, and wherein the first measured time value is equal to a number of power system cycles divided by a nominal power system frequency, the number of power system cycles determined from a plurality of samples of a digitized voltage signal derived from the secondary voltage signal.

16. The method of claim 11, wherein the time error is calculated over a variable time period to detect instantaneous conditions.

17. The method of claim 11, wherein the time error is calculated over a variable time period to detect historical conditions.

18. The method of claim 11, wherein the predetermined threshold is a value range, and wherein an undesirable power system condition is declared at one or more power system locations of the plurality of power system locations if a value of each time differential error associated with the one or more power system locations is outside of the value range.

19. A method for detecting an undesirable power system condition of a power system, the method comprising:
    calculating a plurality of time differential errors, each of the plurality of time differential errors equal to a difference between two different time errors of a plurality of time errors, each of the plurality of time errors calculated at a corresponding different location of the power system and based on a comparison of a measured time value to a reference time value, each of the measured time values based on a corresponding secondary voltage signal measured at the corresponding different location of the power system;
    mapping each of the plurality of time differential errors back to the corresponding different location of the power system; and
    declaring the undesirable power system condition for the corresponding different locations associated with time differential errors that exceed a predetermined threshold.

20. The method of claim 19, wherein each of the plurality of time errors is calculated over a variable time period to detect instantaneous power system conditions.

21. The method of claim 19, wherein each of the plurality of time errors is calculated over a variable time period to detect historical power system conditions.

22. The method of claim 19, wherein the reference time value is provided by a synchronized clock.

23. The method of claim 19, wherein the undesirable power system condition is selected from the group consisting of islanding of at least one of the corresponding different locations associated with time differential errors that exceed the predetermined threshold, pole slipping of a power generator of the power system, and a power swing of the power system.

24. The method of claim 19, wherein each of the measured time value is equal to a number of power system cycles divided by a nominal power system frequency, the number of power system cycles determined from a plurality of samples of a digitized voltage signal derived from the corresponding secondary voltage signal.

25. A method for detecting a power system condition of a power system, the method comprising:
    receiving a plurality of time errors, each of the plurality of time errors equal to a difference between a reference time value and one of a plurality of measured time values, each of the plurality of measured time values based on a frequency dependant parameter measured at a different power system location of a plurality of power system locations of the power system;
    comparing each time error of the plurality of time errors to other selected time errors of the plurality of time errors to form a plurality of time differential errors;
    mapping each of the plurality of time differential errors back to corresponding power system locations of the plurality of power system locations; and
    comparing each of the plurality of time differential errors to a corresponding predetermined threshold, the comparison determinative of the power system condition.

26. The method of claim 25, wherein the predetermined threshold is a threshold value, and wherein an undesirable power system condition is declared at one or more power system locations of the plurality of power system locations if an absolute value of each time differential error associated with the one or more power system locations is greater than the threshold value for a predetermined time period or instantaneously.

27. The method of claim 26, wherein the undesirable power system condition is selected from the group consisting of islanding of at least one power system location of the plurality of power system locations, pole slipping of a power generator of the power system, and a power swing of the power system.

28. The method of claim 26, further comprising causing remedial action to be taken at the one or more power system locations having the undesirable power system condition.

29. The method of claim 25, wherein the frequency dependant parameter comprises a secondary voltage signal, and wherein each of the plurality of measured time values equals a number of power system cycles measured at a corresponding power system location of the plurality of power system locations divided by a nominal power system frequency.

30. The method of claim 29, wherein each of the number of power system cycles is determined from a plurality of samples of a digitized voltage signal derived from a secondary voltage signal at a corresponding power system location of the plurality of power system locations.

31. The method of claim 25, wherein the time error is calculated over a variable time period to detect instantaneous conditions.

32. The method of claim 25, wherein the time error is calculated over a variable time period to detect historical conditions.

33. The method of claim 25, wherein the predetermined threshold is a value range, and wherein an undesirable power system condition is declared at one or more power system locations of the plurality of power system locations if a value of each time differential error associated with the one or more power system locations is outside of the value range for a predetermined time period or instantaneously.

34. The method of claim 25, wherein the reference time value is provided by a synchronized clock means.

35. A system to detect the conditions of a power distribution network comprising:
   a plurality of power system locations interconnected forming a power distribution network;
   a corresponding time error measurement device synchronized to a reference synchronized clock to each corresponding power system location generating a corresponding time error for each corresponding power system location based on a comparison between a frequency-dependent parameter and a reference time value based on a reference start time within the power distribution network;
   a communication network coupled to each corresponding power system location communicating the corresponding time errors within the power distribution network; and
   a means to detect power distribution network conditions including using a comparison device coupled to the communication network generating a power distribution network differential time error by comparing the corresponding plurality of time errors in pairs within the power distribution network.

36. The system of claim 35, wherein the corresponding time error is derived from a corresponding frequency dependent parameter within the power distribution network.

37. The system of claim 36, wherein the frequency dependent parameter is a secondary voltage.

38. The system of claim 35, wherein the conditions include islanding, pole slipping and power swing.

39. The system of claim 35, wherein the conditions reside in a power system location.

40. The system of claim 35, wherein the time error is sampled over a variable time period detecting instantaneous conditions.

41. The system of claim 35, wherein the time error is sampled over a variable time period detecting historical conditions.

42. The system of claim 35, wherein the time error is the time difference between the time measurement device of the corresponding power system location and the reference synchronized clock.

43. The system of claim 35, wherein at least two interconnected power system locations are required forming a power distribution network.

44. The system of claim 35, wherein the conditions are detected between adjacent power system locations within the power distribution network.

45. The system of claim 35, wherein the communication network includes a wide area network, a local area network, a hard wired connection or a wireless communication network.

46. The system of claim 35, wherein the reference synchronized clock is a satellite clock.

47. The system of claim 35, wherein a maximum possible time error pairs Q is defined as:
   $Q=N^2-N$, wherein Q is the maximum possible time error pairs and
   N is the maximum number of power system locations.

48. The system of claim 35, wherein a positive or negative quantity in the time error differential indicates an islanding condition between a pair of power system locations.

49. The system of claim 35, wherein a positive or negative quantity in the time error differential indicates a corresponding positive or negative pole slip condition between a pair of power system locations.

50. The system of claim 35, wherein a positive or negative quantity in the time error differential indicates a corresponding excess or deficiency of power condition between a pair of power system locations.

51. A method to detect the conditions of power distribution networks comprising:
   interconnecting a plurality of power system locations forming a power distribution network;
   coupling a corresponding time error measurement device synchronized to a reference synchronized clock to each corresponding power system location generating a corresponding time error for each corresponding power system location based on a comparison between a frequency-dependent parameter and a reference time value based on a reference start time within the power distribution network;
   communicating the corresponding time errors within the power distribution network through a communication network coupled to each corresponding power system location; and
   detecting conditions including using a comparison device coupled to the communication network generating a power distribution network differential time error by comparing the corresponding plurality of time errors in pairs within the power distribution network.

52. The system of claim 51, wherein the reference synchronized clock is a satellite clock.

53. The method of claim 51, wherein the conditions include islanding, pole slipping and power swing.

54. The method of claim 51, wherein the corresponding time error is derived from a corresponding frequency dependent parameter within the power distribution network.

55. The method of claim 54, wherein the frequency dependent parameter is a secondary voltage.

56. The method of claim 51, wherein the conditions reside in a power system location.

57. The method of claim 51, wherein the time error is sampled over a variable time period detecting instantaneous conditions.

58. The method of claim 51, wherein the time error is sampled over a variable time period detecting historical conditions.

59. The method of claim 51 the time error is the time difference between the time measurement device of the corresponding power system location and the reference synchronized clock.

60. The method of claim 51, wherein at least two interconnected power system locations are required forming a power distribution network.

61. The method of claim 51, wherein the conditions are detected between adjacent power system locations within the power distribution network.

62. The method of claim 51, wherein the communication network includes a wide area network, a local area network, a hard wired connection or a wireless communication network.

63. The method of claim 51, wherein a maximum possible time error pairs Q is defined as:

$Q=N^2-N$, wherein Q is the maximum possible time error pairs and N is the maximum number of power system locations.

64. The method of claim 51, wherein a positive or negative quantity in the time error differential indicates an islanding condition between a pair of power system locations.

65. The method of claim 51, wherein a positive or negative quantity in the time error differential indicates a corresponding positive or negative pole slip condition between a pair of power system locations.

66. The method of claim 51, wherein a positive or negative quantity in the time error differential indicates a corresponding excess or deficiency of power condition between a pair of power system locations.

\* \* \* \* \*

UNITED STATES PATENT AND TRADEMARK OFFICE
CERTIFICATE OF CORRECTION

| | | |
|---|---|---|
| PATENT NO. | : 7,502,696 B2 | Page 1 of 1 |
| APPLICATION NO. | : 11/265417 | |
| DATED | : March 10, 2009 | |
| INVENTOR(S) | : Moxley et al. | |

It is certified that error appears in the above-identified patent and that said Letters Patent is hereby corrected as shown below:

Title Page, Item (12) delete "Moxley" and insert --Moxley et al.--.

Title Page, Item (75) Inventor, should read

--(75) Inventors: Roy E. Moxley, Colfax, VA (US); J. Christopher Anderson, Dothan, AL (US)--.

Signed and Sealed this
Fifteenth Day of March, 2016

Michelle K. Lee
*Director of the United States Patent and Trademark Office*